United States Patent
Howard

(10) Patent No.: US 9,977,655 B2
(45) Date of Patent: May 22, 2018

(54) SYSTEM AND METHOD FOR AUTOMATIC EXTRACTION OF SOFTWARE DESIGN FROM REQUIREMENTS

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

(*) Notice: Subject to any disclaimer, the term of this patent is extended or adjusted under 35 U.S.C. 154(b) by 206 days.

(21) Appl. No.: 14/982,966

(22) Filed: Dec. 29, 2015

(65) Prior Publication Data

US 2016/0188299 A1 Jun. 30, 2016

Related U.S. Application Data

(60) Provisional application No. 62/097,384, filed on Dec. 29, 2014.

(51) Int. Cl.
G06F 9/44 (2018.01)
G06F 9/45 (2006.01)

(52) U.S. Cl.
CPC ............ *G06F 8/20* (2013.01); *G06F 8/10* (2013.01); *G06F 8/35* (2013.01); *G06F 8/43* (2013.01); *G06F 8/433* (2013.01); *G06F 8/49* (2013.01)

(58) Field of Classification Search
CPC .............................................. G06F 8/10–8/78
See application file for complete search history.

(56) References Cited

U.S. PATENT DOCUMENTS

| 5,430,873 | A | 7/1995 | Abe et al. |
|---|---|---|---|
| 5,774,370 | A | 6/1998 | Giomi |
| 6,201,492 | B1 | 3/2001 | Amar et al. |
| 6,370,681 | B1 * | 4/2002 | Dellarocas ............... G06F 8/20 717/110 |
| 6,718,533 | B1 | 4/2004 | Schneider et al. |

(Continued)

FOREIGN PATENT DOCUMENTS

| JP | 2010097426 | 4/2010 |
|---|---|---|
| WO | WO 2007104158 | 9/2007 |

OTHER PUBLICATIONS

Hui, Bowen et al., "Requirements Analysis for Customizable Software—A Goals-Skills-Preferences Framework", pp. 1-10. (Year: 2003).*

(Continued)

*Primary Examiner* — Thuy Dao
*Assistant Examiner* — Christopher J Franco
(74) *Attorney, Agent, or Firm* — Lathrop Gage LLP

(57) ABSTRACT

System, methods, and software products automatically extract software design from a requirements document. A requirements hierarchical decomposition table is generated from the requirements document defining a plurality of decomposition levels. An initial hierarchical decomposition design having a plurality of decomposition levels based upon the requirements hierarchical decomposition table is generated. Input and/or output parameters for each decomposition level in the hierarchical decomposition design are identified, and a current hierarchical decomposition design is generated based upon the initial hierarchical decomposition graph and the input and/or output parameters.

12 Claims, 13 Drawing Sheets

(56) References Cited

U.S. PATENT DOCUMENTS

| | | | |
|---|---|---|---|
| 7,017,146 B2* | 3/2006 | Dellarocas | G06F 8/20 717/106 |
| 7,162,710 B1 | 1/2007 | Edwards et al. | |
| 7,174,286 B2* | 2/2007 | Martin | G06F 8/10 703/22 |
| 8,365,138 B2* | 1/2013 | Iborra | G06F 8/30 717/104 |
| 8,719,549 B2* | 5/2014 | Sasao | H03K 19/1733 712/15 |
| 8,843,879 B2* | 9/2014 | Howard | G06F 8/20 717/104 |
| 2003/0079188 A1 | 4/2003 | McConaghy et al. | |
| 2003/0140332 A1 | 7/2003 | Norton et al. | |
| 2003/0149968 A1 | 8/2003 | Imai | |
| 2003/0216901 A1 | 11/2003 | Schaumont et al. | |
| 2004/0015775 A1 | 1/2004 | Simske et al. | |
| 2004/0015833 A1* | 1/2004 | Dellarocas | G06F 8/20 717/106 |
| 2006/0015858 A1 | 1/2006 | Tanimoto | |
| 2006/0020949 A1 | 1/2006 | Hoshino et al. | |
| 2006/0136850 A1 | 6/2006 | Corbeil, Jr. et al. | |
| 2006/0155526 A1 | 7/2006 | Castillo et al. | |
| 2007/0294578 A1 | 12/2007 | Qiao et al. | |
| 2008/0071801 A1 | 3/2008 | Lucco et al. | |
| 2008/0263506 A1 | 10/2008 | Broadfoot et al. | |
| 2008/0307267 A1 | 12/2008 | Chandrasekaran | |
| 2008/0320054 A1* | 12/2008 | Howard | G06F 8/51 |
| 2009/0077483 A9 | 3/2009 | Howard et al. | |
| 2009/0119484 A1 | 5/2009 | Stefan et al. | |
| 2009/0241106 A1 | 9/2009 | Andersen | |
| 2009/0265696 A1 | 10/2009 | Grice | |
| 2010/0153908 A1 | 6/2010 | Sarkar et al. | |
| 2011/0153980 A1* | 6/2011 | Sasao | H03K 19/1733 712/7 |
| 2011/0283095 A1 | 11/2011 | Hall et al. | |
| 2012/0066664 A1* | 3/2012 | Howard | G06F 8/20 717/106 |
| 2012/0101929 A1 | 4/2012 | Howard | |
| 2014/0068551 A1* | 3/2014 | Balasubramanian | G06F 8/35 717/107 |
| 2015/0121381 A1* | 4/2015 | Chen | G06F 8/70 718/102 |

OTHER PUBLICATIONS

Bansiya, Jagdish et al., "A Hierarchical Model for Object-Oriented Design Quality Assessment", pp. 4-17. (Year: 2002).*

Axel van Lamsweerde, "Goal-Oriented Requirements Enginering—A Roundtrip from Research to Practice", pp. 1-4. (Year: 2004).*

Forward, Andrew et al., "The Relevance of Software Documentation, Tools and Technologies—A Survey", pp. 26-33. (Year: 2002).*

Tichy, Walter F. et al., "Text to Software—Developing Tools to Close the Gaps in Software Engineering", pp. 379-383. (Year: 2010).*

Sharma, Vibhu Saujanya et al., "Extracting High-Level Functional Design from Software Requirements", pp. 35-42 (Year: 2009).*

Bilung Lee, "Fusing DataFlow with Finite State Machines", May 1996, 28 pp.

PCT Application PCT/US2013/033125 International Search Report and Written Opinion, dated Jun. 27, 2013, 8 pages.

PCT Application PCT/US2013/044573 International Search Report and Written Opinion dated Jul. 22, 2013, 8 pages.

Ward, et al., "Structured Development for Real Time Systems," vol. 1: Introduction & Tools, Published by Prentice-Hall, Inc., 1985.

U.S. Appl. No. 13/490,345 Office Action dated Aug. 30, 2013, 16 pages.

U.S. Appl. No. 13/490,345 Response to Office Action filed Dec. 2, 2013, 10 pages.

U.S. Appl. No. 13/490,345 Notice of Allowance dated Feb. 3, 2014, 27 pages.

PCT Application PCT/US2013/044818 International Search Report and Written Opinion dated Sep. 13, 2013, 9 pages.

Yourdon, "Modern Structured Analysis," Published by PTR Prentice Hall 1989, pp. Intro to 189.

Yourdon, "Modern Structured Analysis," Published by PTR Prentice Hall 1989, pp. 190-400.

Yourdon, "Modern Structured Analysis," Published by PTR Prentice Hall 1989, pp. 401-667.

* cited by examiner

TEST PROCEDURE

| TEST PROCEDURE ▶ | ADD | DELETE | RUN |

Process name test1_K_37

Test Procedure Name: TEST PROCEDURE  *402*

Test Procedure Description:  *404*

Select Requirement: TEST ▶

Input Parameters:  *406*

| Parameter Name | Data Type | Dimension Size | Dimension Size | Enter Value |
|---|---|---|---|---|
| Main_fact | Int | ° | ° | |

Input Parameters:  *408*

| Parameter Name | Data Type | Dimension Size | Estimated Value | Error Range | Actual Value |
|---|---|---|---|---|---|
| Main_RETURN | Int | ° | | | |

| WORK BREAKDOWN STRUCTURE 902 | PASSIVE REQUIREMENT TEXT 904 | REQUIREMENT CALLING CONDITION 906 |
|---|---|---|
| 1.0 | REQUIREMENT 1.0 | INITIAL CONDITION |
| 1.1 | REQUIREMENT 1.1 | INITIAL CONDITION |
| 1.1.1 | REQUIREMENT 1.1.1 | INITIAL CONDITION |
| 1.1.2 | REQUIREMENT 1.1.2 | AFTER 1.1.1 |
| 1.1.3 | REQUIREMENT 1.1.3 | AFTER 1.1.2 |
| 1.1.4 | REQUIREMENT 1.1.4 | AFTER 1.1.3 |
| 1.2 | REQUIREMENT 1.2 | AFTER 1.1 |
| 1.3 | REQUIREMENT 1.3 | AFTER 1.3 |
| 2.0 | REQUIREMENT 2.0 | AFTER 1.0 |

*FIG. 9*

SYSTEM AND METHOD FOR AUTOMATIC EXTRACTION OF SOFTWARE DESIGN FROM REQUIREMENTS

CROSS-REFERENCE TO RELATED APPLICATIONS

This application claims priority to U.S. Patent Application Ser. No. 62/097,384, filed Dec. 29, 2014, entitled "System and Method for Automatic Extraction of Software Design from Requirements", which is incorporated herein by reference. This application is also related to U.S. patent application Ser. No. 13/425,136, filed Mar. 20, 2012, entitled "Parallelism from Functional Decomposition," which is incorporated herein by reference for enablement purposes (hereinafter the '136 app).

BACKGROUND

Creation of software is typically complex and difficult. The creation of a complex software system involves creating and managing a project. Creation of a project often starts with creation of a requirements document.

Requirements represent the functionality that is essential for a software design and/or application to satisfy. Prior methods of software creation require a software developer to manually convert a requirements document into a software design, and then manually convert that design into a software code. Converting a requirements document into software design and/or software code is costly and can take a lot of time.

SUMMARY OF THE INVENTION

In one embodiment, a method automatically extracts software design from a requirements document. A requirements hierarchical decomposition table is generated from the requirements document defining a plurality of decomposition levels. An initial hierarchical decomposition design having a plurality of decomposition levels based upon the requirements hierarchical decomposition table is generated. Input and/or output parameters for each decomposition level in the hierarchical decomposition design are identified, and a current hierarchical decomposition design is generated based upon the initial hierarchical decomposition graph and the input and/or output parameters.

In another embodiment, a software product has instructions, stored on non-transitory computer-readable media, wherein the instructions, when executed by a computer, perform steps for automatic extraction of software design from a requirements document. The software product includes (A) instructions for generating a requirements hierarchical decomposition table from the requirements document defining a plurality of decomposition levels; (B) instructions for generating an initial hierarchical decomposition design having a plurality of decomposition levels based upon the requirements hierarchical decomposition table; (C) instructions for identifying input and/or output parameters for each decomposition level in the hierarchical decomposition design; and (D) instructions for generating a current hierarchical decomposition design based upon the initial hierarchical decomposition graph and the input and/or output parameters.

In another embodiment, a development server automatically extracts software design from a requirements document. The development server includes a processor and a non-transitory memory communicatively coupled with the processor for storing (i) the requirements document and (ii) a software design extraction module implemented as machine readable instructions. The machine readable instructions, when executed by the processor, are capable of: (A) generating a requirements hierarchical decomposition table from the requirements document defining a plurality of decomposition levels; (B) generating an initial hierarchical decomposition design having a plurality of decomposition levels based upon the requirements hierarchical decomposition table; (C) identifying input and/or output parameters for each decomposition level in the hierarchical decomposition design; and (D) generating a current hierarchical decomposition design based upon the initial hierarchical decomposition graph and the input and/or output parameters.

BRIEF DESCRIPTION OF THE FIGURES

FIG. 4 depicts an exemplary interface for defining the test procedure of FIG. 2.

FIG. 9 depicts an exemplary hierarchy table, in one embodiment.

DETAILED DESCRIPTION OF THE DRAWINGS

Figure 1:
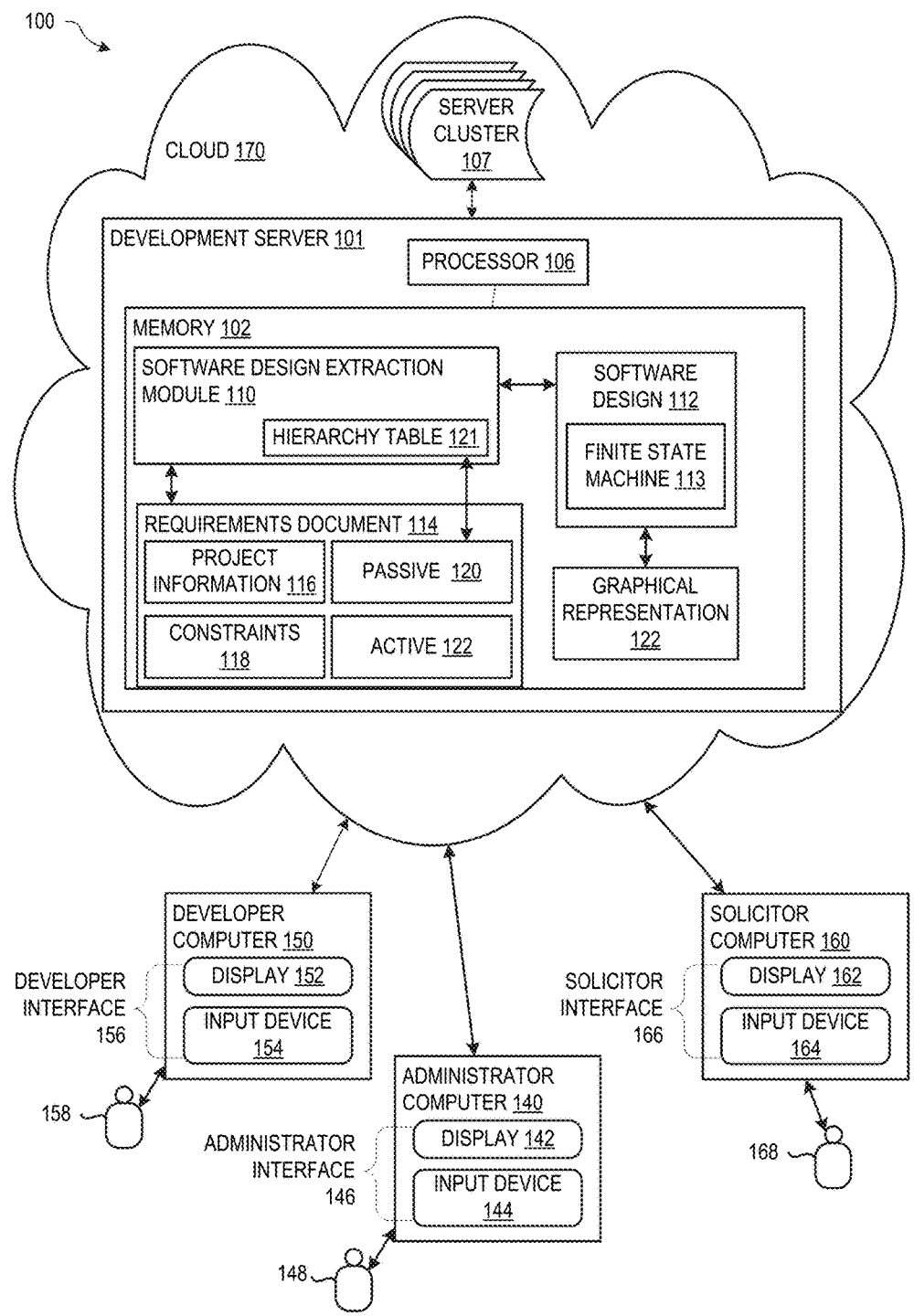
FIG. 1 depicts an exemplary software development system for automatic extraction of design from requirements, in one embodiment.

Reference is now made to the figures wherein like parts are referred to by like numerals throughout. Referring generally to the figures, the present invention includes a device and method for automatically assessing developer performance.

Definitions

The following terms and concepts used herein are defined below.

Data transformation—A data transformation is a task that accepts data as input and transforms the data to generate output data.

Control transformation—A control transformation evaluates conditions and sends and receives control to/from other control transformations and/or data transformations.

Control bubble—A control bubble is a graphical indicator of a control transformation. A control bubble symbol indicates a structure that performs only transitions and does not perform processing.

Process bubble—A process bubble is a graphical indicator of a data transformation.

Control Kernel/Control Flow—A "control kernel", also used herein as "control flow" is a software routine or function that contains only the following types of computer language constructs: declaration statements, subroutine calls, looping statements (for, while, do, etc), decision statements (if-else, etc.), arithmetic statements (including increment and decrement operators), relational operators, logical operators, type declarations and branching statements (goto, jump, continue, exit, etc.).

Process Kernel/Process Flow—A "process kernel", also used herein as "process flow" is a software routine or function that contains the following types of computer language constructs: assignment statements, looping statements, arithmetic operators (including increment and decrement operators), and type declaration statements Information is passed to and from a process kernel via global memory using RAM.

Function—a software routine, or more simply an algorithm that performs one or more data transformations.

Node—A node is a processing element including a processing core, or processor, memory and communication capability.

Metadata—Metadata is information about an entity, rather than the entity itself.

MPT Algorithm—An MPT algorithm includes control kernels, process kernels, and MPT algorithms.

MPT Data Transfer Model—The MPT data transfer model includes a standard model for transferring information to/from a process kernel. The model includes a key, a starting address, a size, and a structure index. The key is the current job number, the starting address is the information starting address, the size is the number of bytes the data construct uses, and the structure index points to a structure definition that is used by the process kernel to interpret the memory locations accessed.

MPT State Machine—An MPT state machine is a two-dimensional matrix which links together all relevant control kernels into a single non-language construct that calls process kernels. Each row in a MPT state machine consists of an index, the subroutine to be called (or the symbol "NOP"), a conditional statement, an index to the next accessible row (when the condition is true, or an end-of-job symbol is encountered), and an index to the next accessible row (when the condition is false, or when an end-of-job symbol is encountered). Process kernels form the "states" of the state-machine while the activation of those states form the state transition. This eliminates the need for software linker-loaders.

State Machine Interpreter—for the purpose of the present document, a State Machine Interpreter is a method whereby the states and state transitions of a state machine are used as active software, rather than as documentation.

Data store—A data store is a compilation of various software process codes. The data store may be located within the "cloud" (e.g., cloud 170, FIG. 1) or may be localized within a server (e.g., server 101, FIG. 1).

Terminator—A terminator is an activity that occurs outside of the scope of the current software design. For example, data is sent from the terminator into the current software design, but the means of producing the data from the terminator are not relevant to the software design.

Computing Environment:

FIG. 1 depicts an exemplary software development system 100 for automatic extraction of design from requirements, in one embodiment. System 100 includes a development server 101 that is located within the cloud 170 (e.g. a computer network accessible via the Internet) and communicatively coupled to a server cluster 107. Server cluster 107 is for example a plurality of processing nodes configured to operate as a Howard Cascade.

Software development system 100 may be utilized to connect a solicitor 168 with a developer 158 to generate a particular software design (e.g. software design 112) that implements a desired function. Software design 112 is for example a hierarchical functional decomposition software design as disclosed in U.S. application Ser. No. 13/425,136 (e.g. decomposition of algorithm 117 within application Ser. No. 13/425,136). Software design 112 may have a plurality of elements, each of which may be one or more of control kernel, process kernel, data transformation, control transformation, control bubble and process bubble as defined in the '136 App. An administrator 148 may oversee software development system 100 and the creation of one or more software designs. Software design 112 may have a finite state machine 113 associated therewith. Administrator 148 may access software development system 100 via an administrator computer 140 having an administrator interface 146 including a display 142 and an input device 144. Developer 158 may access software development system 100 via a developer computer 150 having a developer interface 156 including a display 152 and an input device 154. Solicitor 168 may access software development system 100 via solicitor computer 160 having a solicitor interface 166 including a display 162 and input device 164.

Developer server 101 is for example at least one computer with at least one processor 106 and a memory 102 that stores a software design extraction module 110 for extracting a software design 112 from a requirements document 114. Requirements document 114 includes one or more of (i) project information 116, (ii) code sort constraints 118, (iii) passive requirements 120, and (iv) active requirements 122.

Figure 2:
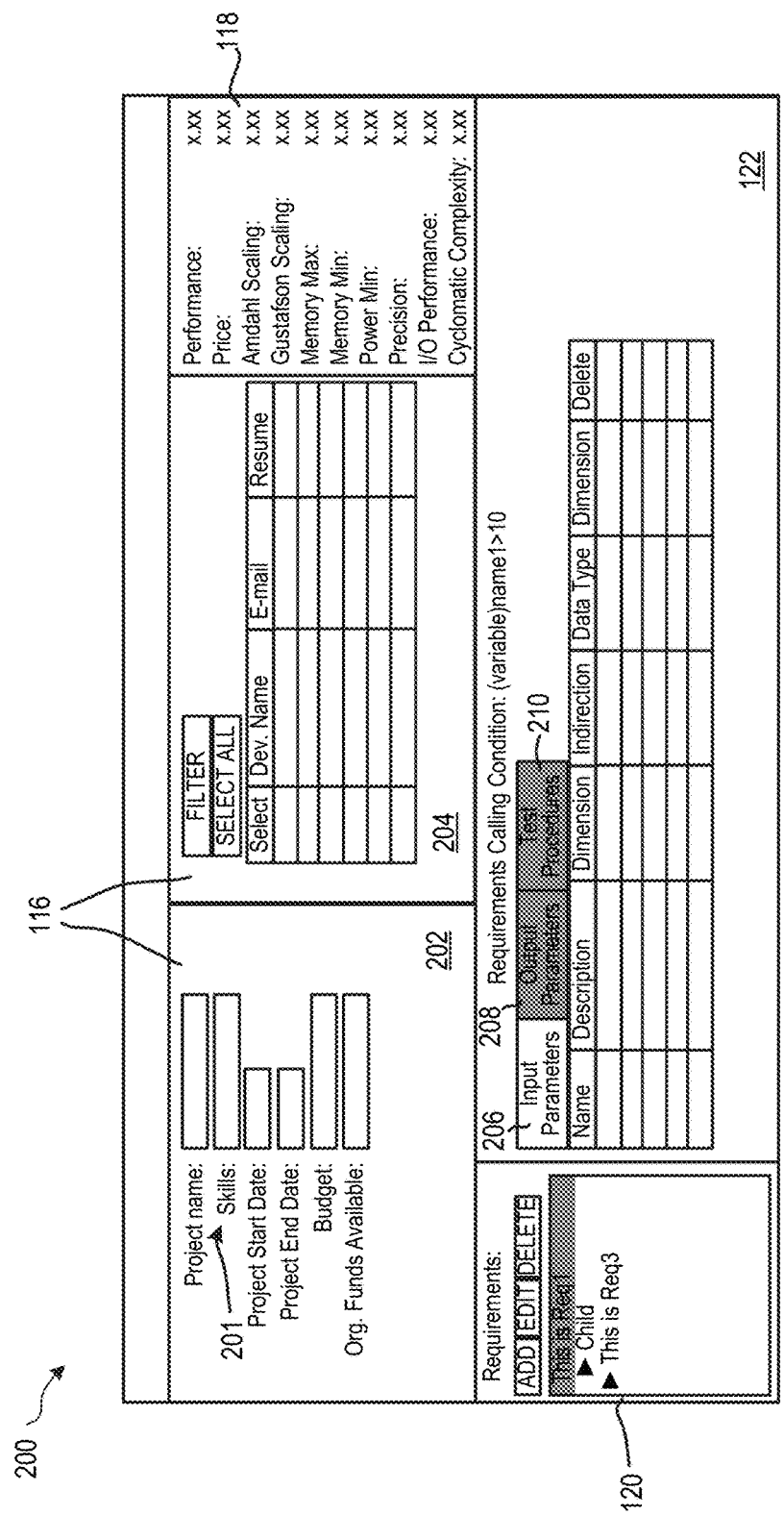
FIG. 2 depicts an exemplary interface for defining the requirements document of FIG. 1.

FIG. 2 depicts an exemplary interface 200 for defining the requirements document 114, of FIG. 1. Interface 200 may be displayed on one or more of displays 142, 152, and 162. In one embodiment, developer 150, administrator 140, and/or solicitor 160 interact with interface 200 to define one or more of project information 116, code sort constraints 118, passive requirements 120, and active requirements 122.

For project information 116, interface 200 includes project information section 202 and project team selection information 204. Project information section 202 details information needed to manage a project created from requirement extraction including the project name, the skills 201 required by this project, and starting and ending dates. Project team selection section 204 details both a list of potential developers (e.g., developer 158 for writing any code) and a filtering mechanism. The filtering mechanism is for example a skill filter which removes all potential developers from the team selection list except those who have the project-required skills. The resumes of potential developers are also viewable.

Figure 3:
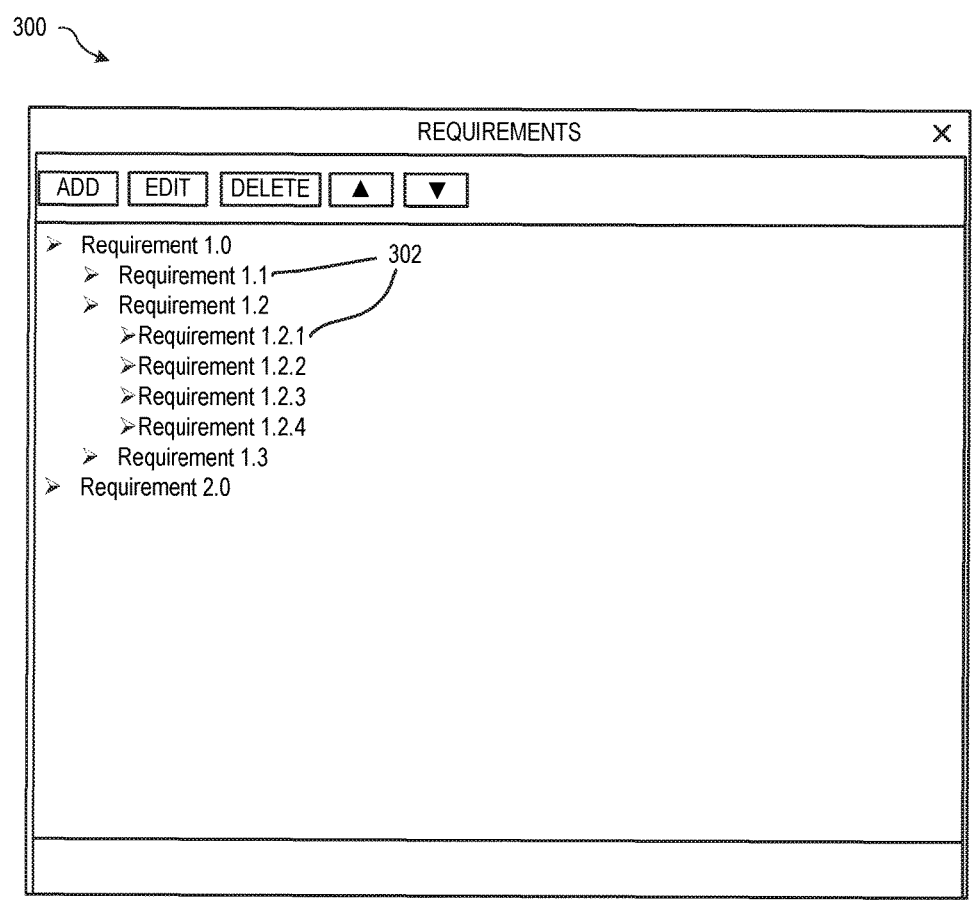
FIG. 3 depicts an exemplary work-breakdown structure of the passive requirements of FIG. 1.

The passive requirements 120 include a work-breakdown structure and a requirement text. The work-breakdown structure indicates the hierarchy of the requirement and the requirement text is a human-readable description of the requirement. FIG. 3 depicts an exemplary work-breakdown structure 300 of passive requirements 116, of FIG. 1. A process name 302 includes the project name, the process type (MPT kernel or MPT algorithm) and the work-breakdown structure. A MPT kernel—but not a MPT algorithm—is the lowest level of the requirement hierarchy. The work-breakdown structure is shown by point-separated numbers that indicate the hierarchical location of requirements. For example, "1.2.3" indicates the third sub-requirement of the second sub-requirement of the first requirement.

Active requirements 122 include input parameters 206, output parameters 208, and test procedures 210. Active requirements 122 may be input manually into system 100 by one or more of administrator 148, developer 158 and solicitor 168. Both the input and output parameters 206, 208 have a parameter name, human-readable description, a number of dimensions represented by the parameter, a number of pointer offsets (indirections) to the parameter, a data type of the parameter, and dimensional sizes. The test procedure 210 portion of the active requirements 122 consists of a process name, description, requirement, input parameters and output parameters.

FIG. 4 depicts an exemplary interface 400 for defining test procedure 210 of FIG. 2. Interface 400 is accessed for example by selecting test procedure button 210 in interface 200. Interface 400 allows administrator 148, developer 158, and/or solicitor 168 to define the test procedure name 402, test procedure description 404, input parameters 406, and/or output parameters 408.

The passive requirements 120, active requirements 122 (which include test procedures) and the list of skills 201 of the project information 116 may be used by the software design extraction module 110 to find, test and attach code to the software design 112. The code sorting constraints 118 act on the last part of the code attachment process as it identifies the order that the found code is sorted into. To identify the sorting order of the priority, the priority number is changed from 0 to 10. The highest priority number represents the first sort priority for the code sorting constraints 118. The following listing shows exemplary code sorting constraints 118 along with a definition of each:

Performance—How fast some found code process the entered test data;
Price—The wholesale price of the current component;
Amdahl Scaling—Fixed dataset-size performance scaling;
Gustafson Scaling—Variable dataset-size performance scaling;
Memory maximization—Performance with maximum dataset size;
Power minimization—Electrical power consumption minimized;
Precision—Number of bits of actual precision;
I/O performance—Input and output bits per second;
Cyclomatic Complexity—Minimized cyclomatic complexity.

Figure 5:
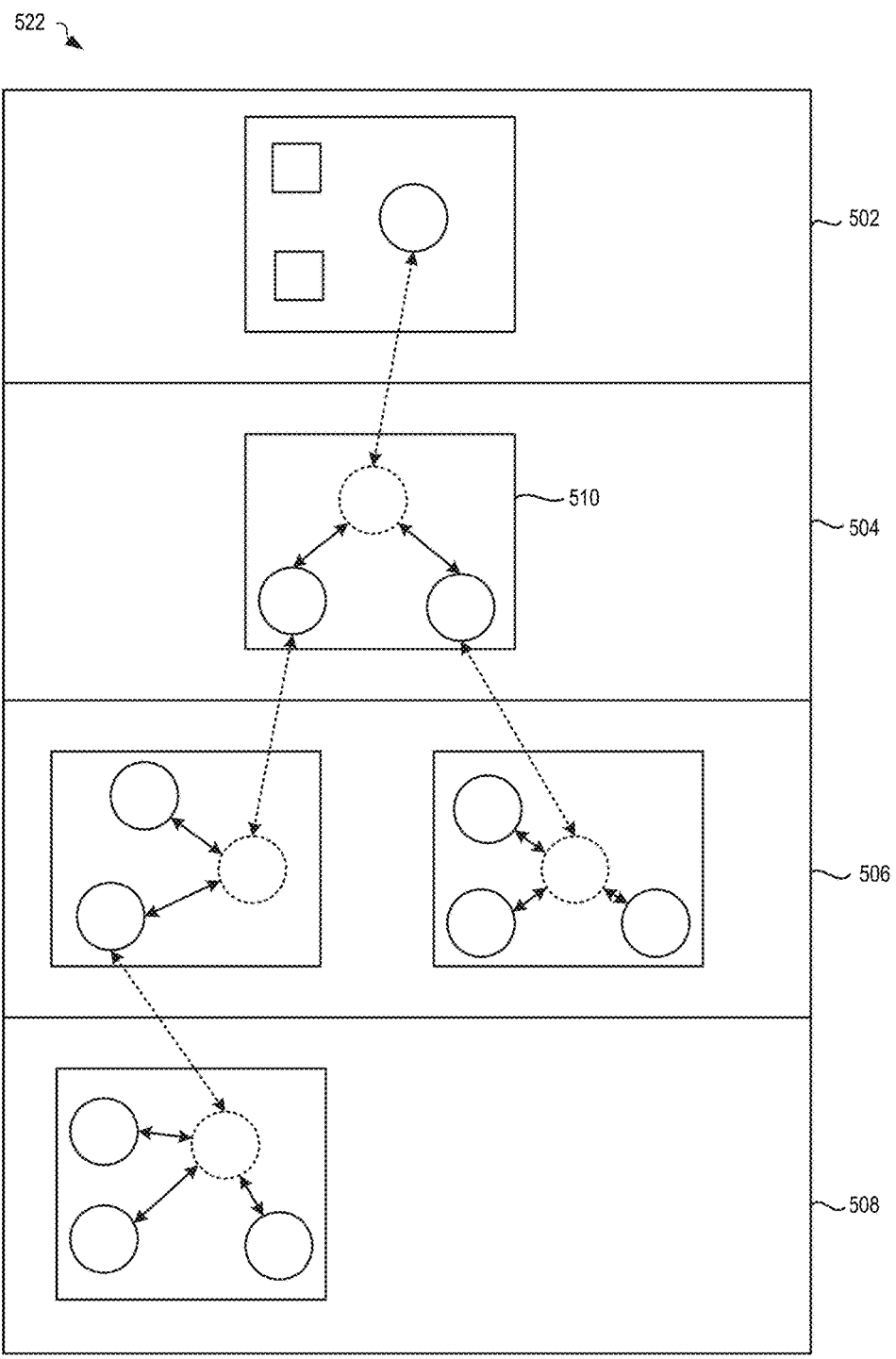
FIG. 5 depicts an exemplary graphical representation of a MPT decomposition diagram, in one embodiment.

Software design extraction module 110 is for example implemented as computer-readable instructions stored within non-transitory memory 102 that when executed by processor 106 operate to utilize information from requirements document 114—including project information 115, code sorting constraints 118, passive requirements 120, and active requirements 122—to generate software design 112. Software design 112 is for example a MPT decomposition diagram. FIG. 5 depicts an exemplary graphical representation 522 of a MPT decomposition diagram, in one embodiment. As illustrated in FIG. 5, dashed lines represent control flows, solid lines represent data flows, dashed circles (i.e. control bubbles) represent control transforms, solid circles (i.e. process bubbles) represent process transforms, and small squares represent terminators. Graphical representation 522 includes four design levels 502, 504, 506 and 508. It should be appreciated that more complex or simpler software designs may be utilized without departing from the scope hereof.

Figure 6:
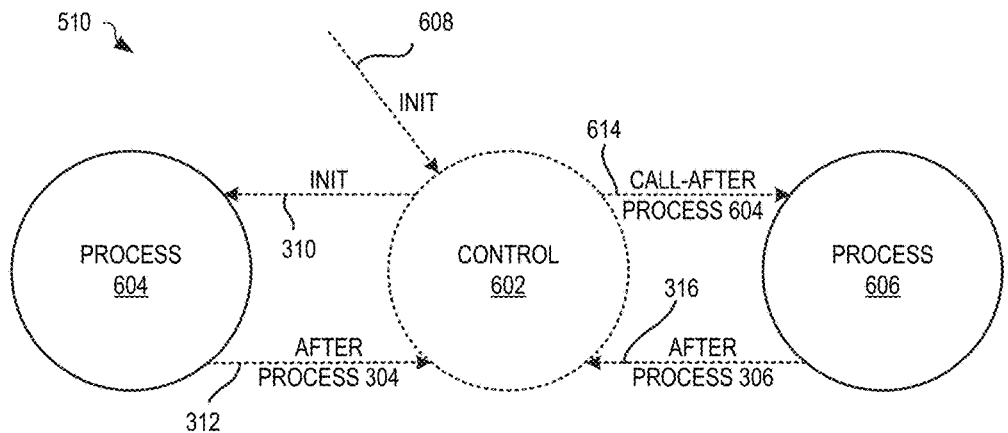
FIG. 6 depicts an exemplary software design process kernel of one of the decomposition levels of FIG. 5 having a plurality of control flows.

FIG. 6 depicts an exemplary software design process kernel 510 of level 504 of FIG. 5 having a plurality of control flows 608-614. If a process is equated to a requirement to be satisfied (i.e. by the software design) then each decomposition level could represent a group of linked requirements. Within a decomposition level, processes are always linked together using control flows attached to the central control transform. The purpose of a control flow is to specify when some process is to be called.

The control flows within FIG. 6 may contain three types of conditional statements: "init", "if" and "call-after" or some combination of "if" and "call-after". The "init" conditional statement (e.g. control flows 608, 610) represents the beginning of a series of processes. Note that the "init" condition is contained within control flow "C1" of FIG. 5. The first of a series of processes must have a start-by date and duration. If a control flow attached to a process does not contain either an "init" or a "call-after" conditional statement then it is considered the beginning of a series of processes. A series may be one or more processes linked together. The "call-after" conditional statement represents a sequence of activity: the current process is called after some other process has completed.

Accordingly, the process kernel 510 would operate by control flow 608 initializing control transformation 602. Control transformation 602 would then execute control flow 610 to initialize process 604. After process 604 is executed, control flow 612 executes to return to control transform 602 which then executes control flow 614 to execute process 606. After process 606, control flow 616 executes to return to control transform 602.

Figure 7:
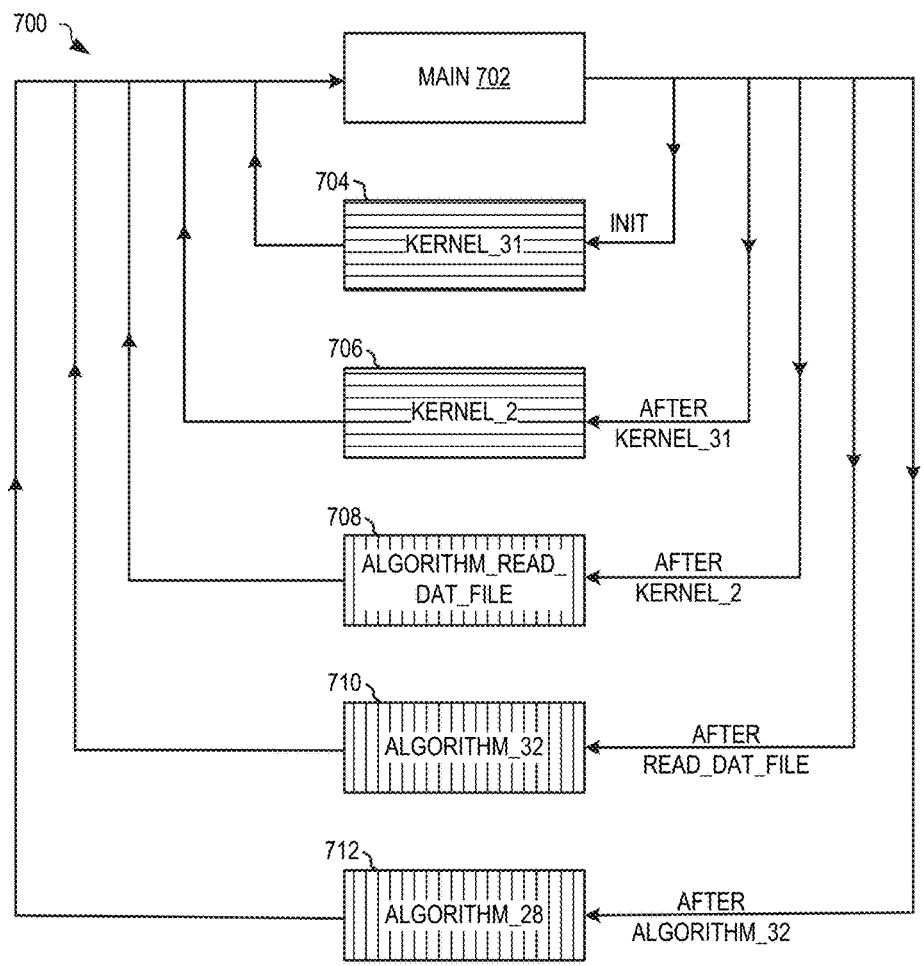
FIG. 7 depicts an exemplary graphical representation of a finite state machine of software design of FIG. 1, in one embodiment.

FIG. 7 depicts an exemplary graphical representation 700 of a finite state machine 113 of software design 112 of FIG. 1, in one embodiment. For example, graphical representation 700 may be stored within memory as graphical representation 122. The software design 112 is typically displayed as a decomposition graph as discussed above with reference to FIGS. 5 and 6. The decomposition graph may be transformed into a finite state machine which shows only the control flows (as state transitions) and processes (as states). In one embodiment, the transformation of the decomposition graph into a finite state machine is automatic. Thus, the creation of the software design 112 automatically creates the finite state machine and corresponding graphical representation 122. As illustrated in FIG. 7, main 702 (without shading) represents the control process 602. The horizontal shading, as shown in kernel_31 704, and kernel_2 706, represents non-decomposable processes (kernels). The vertically shaded processes, as shown in elements 708-712, represent decomposable processes (algorithms).

Referring back to FIG. 2, the amount of information available from the interface 200 is enough information to create an MPT decomposition graph. As discussed above, the work-breakdown structure of the passive requirements 118 is hierarchical. Moreover, as discussed above, a MPT decomposition graphs also hierarchical. Accordingly, it is possible to display the hierarchy of the requirement as a decomposition diagram.

Figure 8:
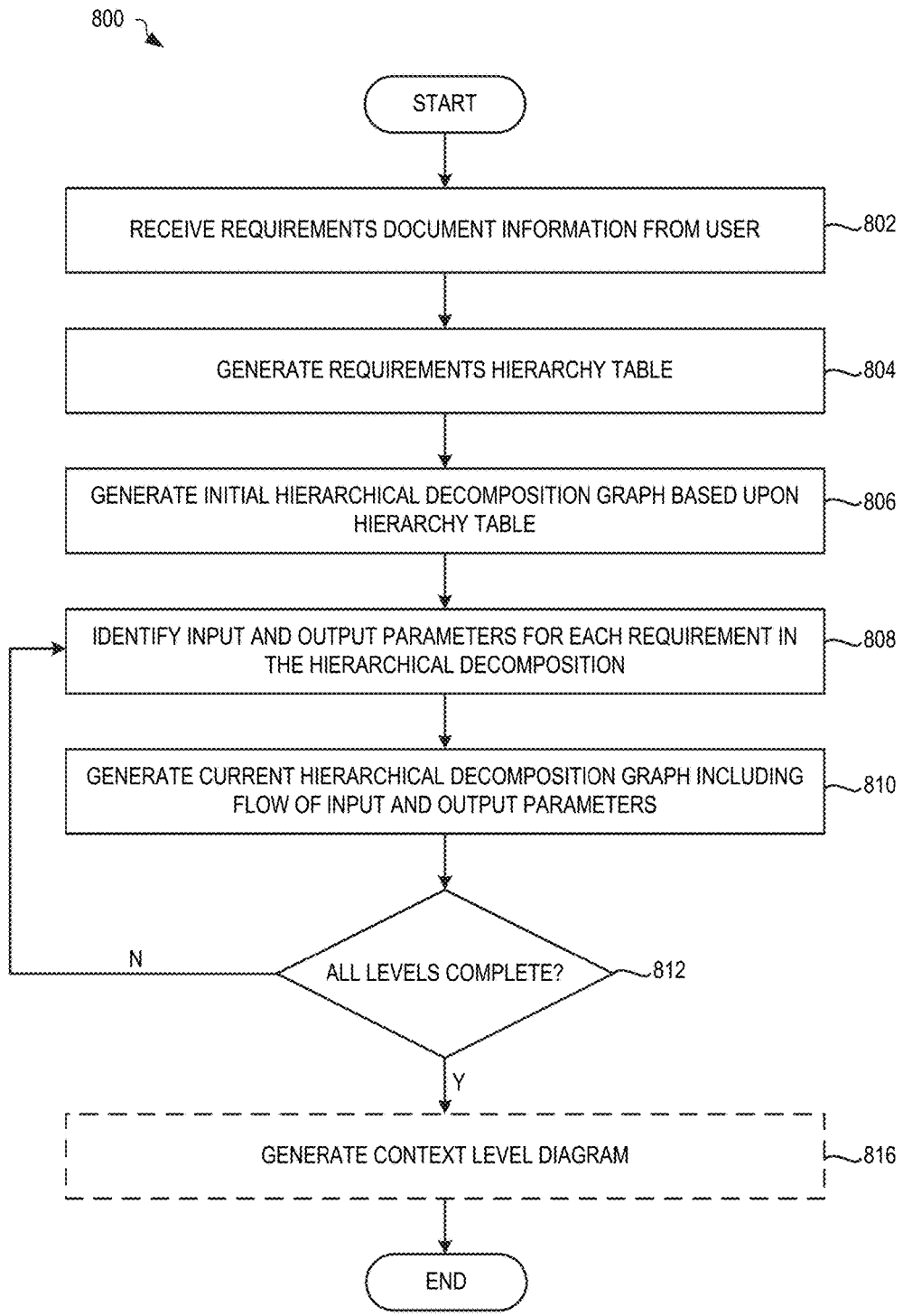
FIG. 8 is a flowchart depicting an exemplary method for creating a software design decomposition from a requirements document, in one embodiment.

FIG. 8 is a flowchart depicting an exemplary method 800 for creating a software design decomposition from a requirements document, in one embodiment. Method 800 is for example implemented within system 100, particularly within software design extraction module 110.

In step 802, method 800 receives requirements document information from a user. In one example of method 800, one or more of administrator 148, developer 158, and solicitor 168 inputs requirements document 114—including project information 116, code sorting constraints 118, passive requirements 120, and active requirements 122—into development server 101 via interface 148, 158, 168, respectively.

In step 804, method 800 generates a requirements hierarchy table. In one example of step 804, software design extraction module 110 analyzes the work-breakdown structure within passive requirements 120 and generates a hierarchy table 121. FIG. 9 depicts an exemplary hierarchy table 900. Table 900 includes a work-breakdown structure 902, a passive requirement text 904, and a requirement calling condition 906 generated by the software design extraction module 110. For example, each requirement within table 900 is equated to either an MPT kernel or an MPT algorithm. An MPT kernel contains no control statements and represents the smallest programming task available. An MPT algorithm contains control statements linking together multiple kernels and/or algorithms. The requirement-calling condition 906 describes the logical/mathematical condition under which the requirement is activated.

Figure 10:
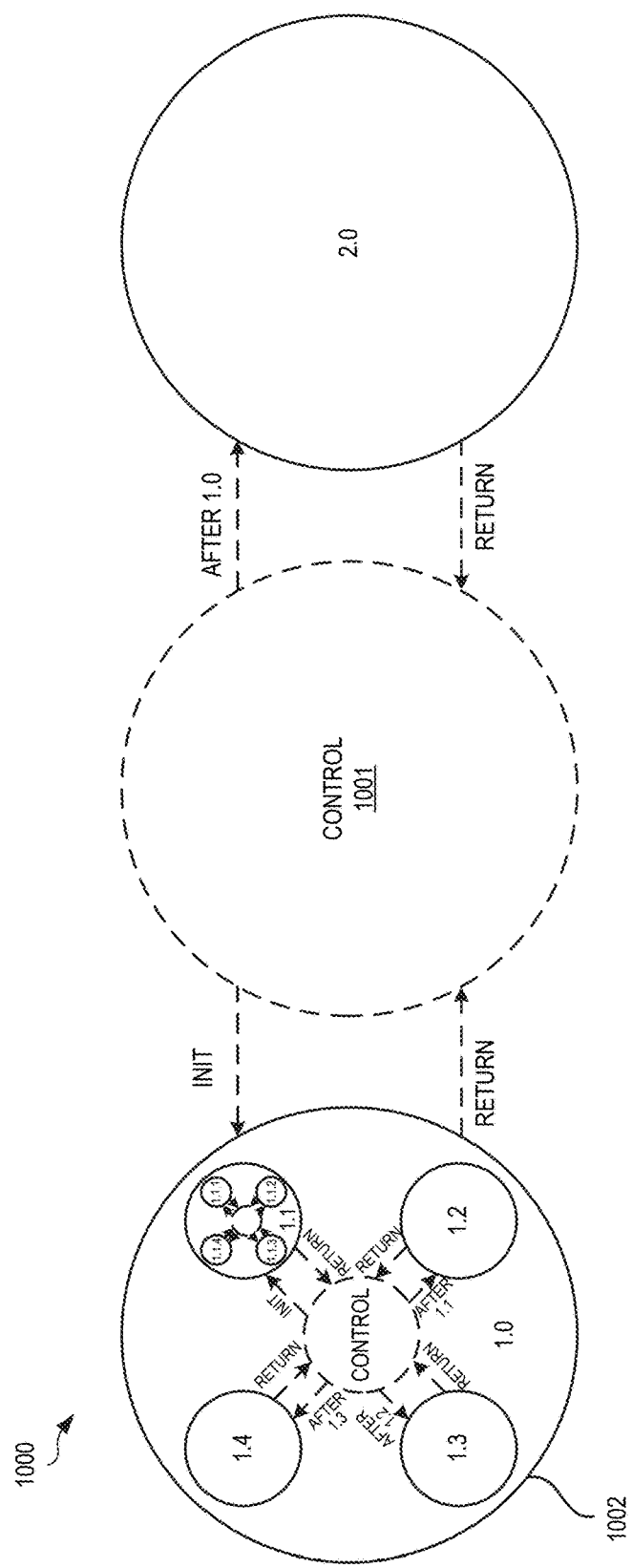
FIG. 10 depicts an exemplary decomposition graph for the hierarchy table of FIG. 9.

In step 806, method 800 generates an initial hierarchical decomposition graph based upon the hierarchy table. In one example of step 806, software design extraction module 110 generates software design 112 as a decomposition graph based upon hierarchy table 121 generated during step 804. FIG. 10 depicts an exemplary decomposition graph 1000 for the hierarchy table 900 of FIG. 9. Within FIG. 10, the decomposition graph 1000 is created starting at the first decomposition level 1002 (i.e. level 1.0). Module 110 then finishes the remainder of the graph according to the hierarchy table 900, including associating control flows including the requirement calling conditions such as "init", "return", and "after x.x" based upon table 900. The context or zero decomposition level (0.0) has not yet been created. Before the context level may be created, the data stores and terminators are created.

In step 808, method 800 identifies all input and output parameters for each requirement in the hierarchical decomposition. In one example of step software design extraction module 110 analyzes active requirements 122 to identify each input and output parameters 206, 208 associated with each requirement and sub-requirement within hierarchical table 900 and/or graph 1000.

In step 810, method 800 generates a current hierarchical decomposition graph including flow of input and output parameters. In one example of step 810, the software design 112, generated in step 806, is updated to include input and output parameters associated with one or more requirements.

Figure 11:
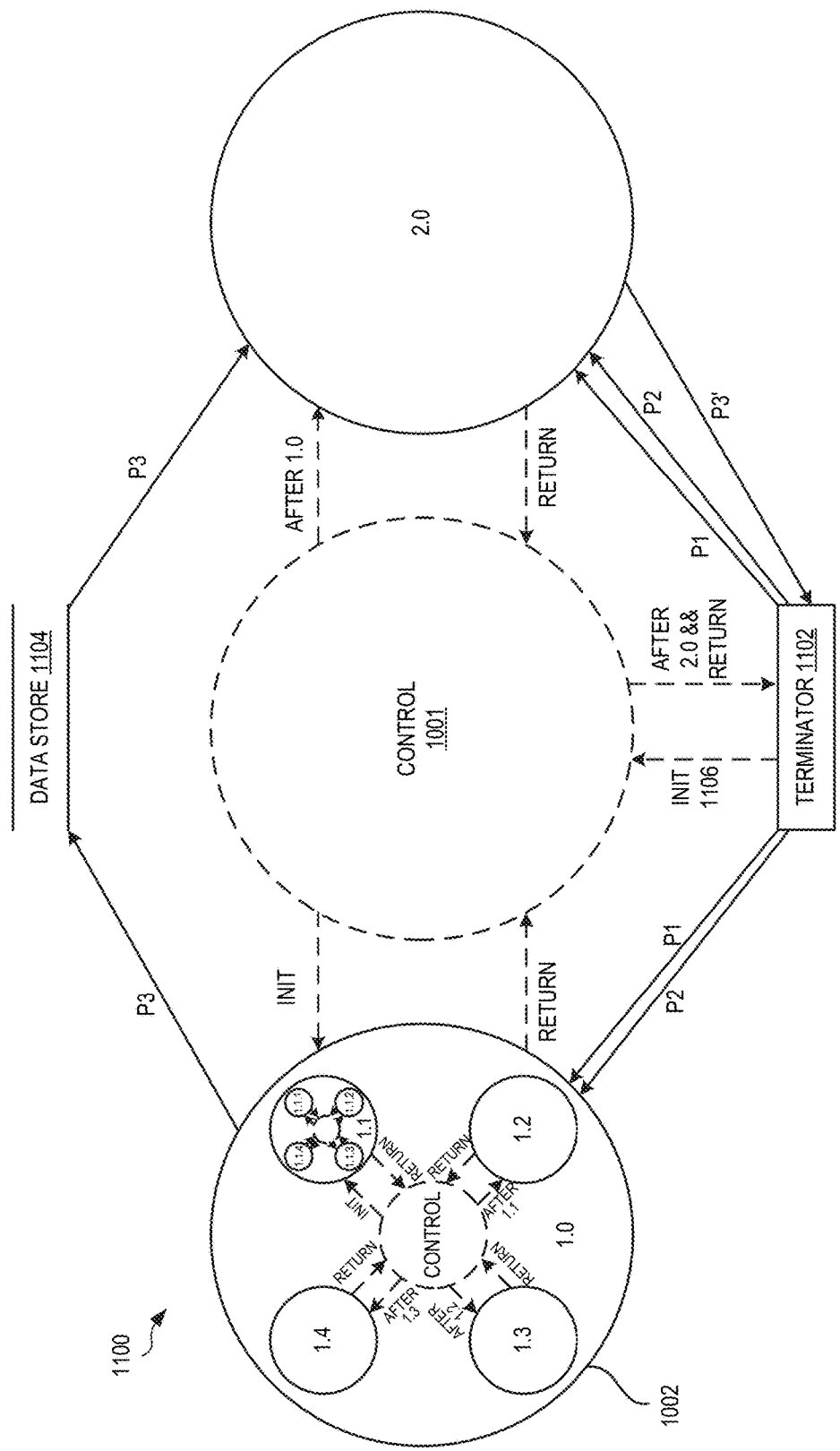
FIG. 11 depicts an exemplary decomposition graph generated by the software design extraction module of FIG. 1.

FIG. 11 depicts an exemplary decomposition graph 1100 generated by the software design extraction module of FIG. 1. Data flows from outside of a decomposition level to the decomposition level internals and then back again. Accordingly, any input or output parameter attached to a requirement at the x.0 (1.0, 2.0, etc.) that is not an output from a proceeding requirement is assigned to an initializing terminator 1102. For example, a software design may include (i) structure 1.0 that is called using the initial condition, receives input parameters P1 and P2, and creates an output parameter P3, and (ii) structure 2.0 is called after structure 1.0 and receives an input parameter of P1, P2, and P3, creating output parameter P3'. Based on the above, module 110 generates the decomposition graph 1100 of software design 112 having the shown inputs and outputs including the following conditions:

Graph 1100 includes a terminator 1102, a data store 1104, and control process 1001 are created.

Terminator 1102 transmits the initialization "init" control condition 1106 to control 1001 and the P1, P2 input parameters to work-breakdown structure number (WBSN) 1.0.

The controller 1001 transmits the "init" control condition to WBSN 1.0 which converts P1 and P2 into output parameter P3. If no other WBSN followed after WBSN 1.0, the P3 would have been placed back into the terminator 1102, but WBSN 2.0 follows WBSN 1.0 and consumes P3, so P3 is placed in the newly created data store 1104.

WBSN 2.0 is called after WBSN 1.0 and receives input parameters P1, P2, and P3. Since P1 and P2 are not created from some prior WBSN and occur in the terminator 1102, they are received as input parameters from the terminator 1102.

WBSN 2.0 converts P1, P2, and P3 into output parameter P3'. There is a return to the terminator after WBSN 2.0, and P3' is placed into the terminator 1102.

Figure 12:
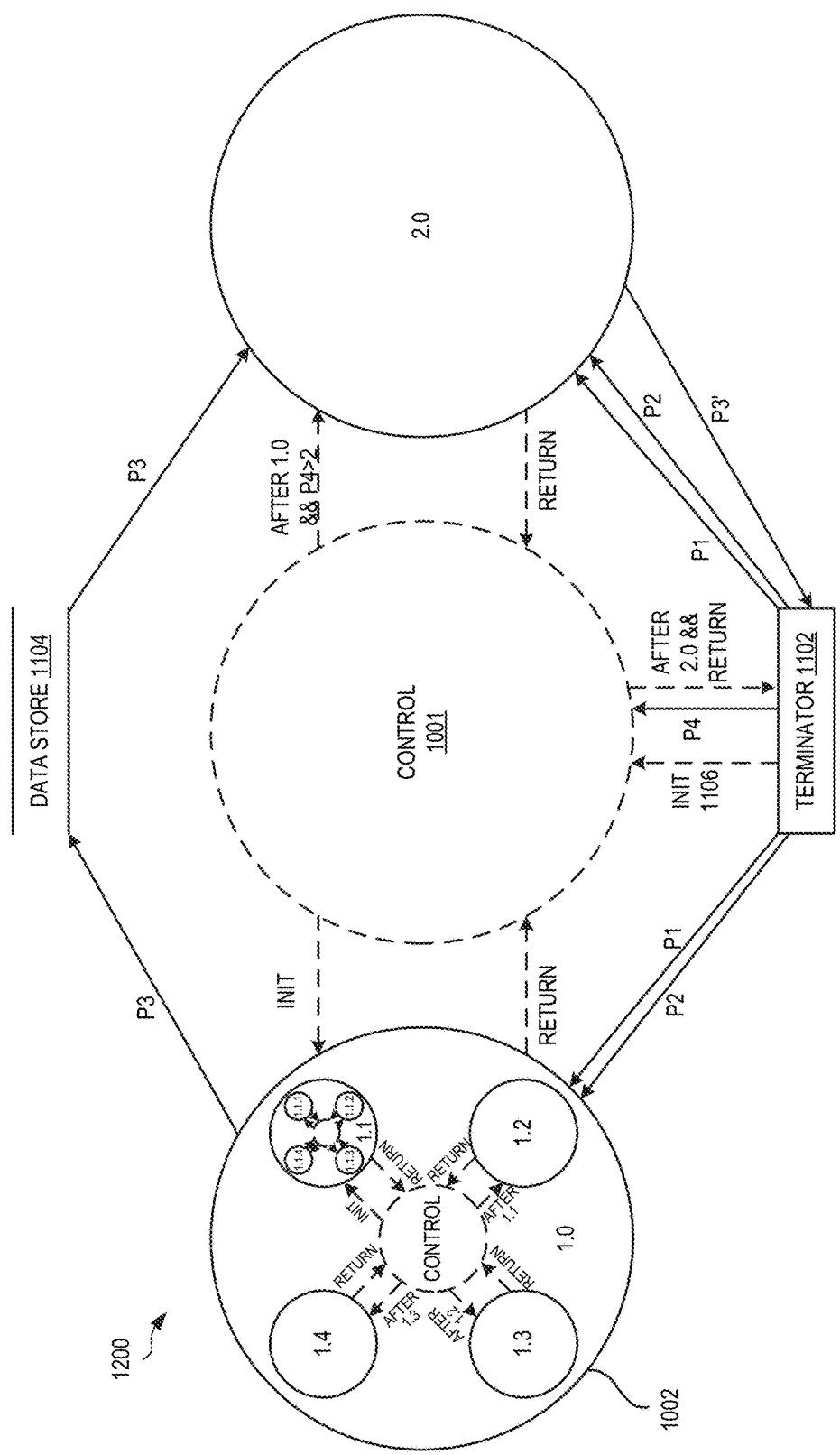
FIG. 12 depicts an exemplary hierarchy graph, where parameter P4 is not generated by a proceeding first WBSN used to call a second WBSN, in one embodiment.

Additionally, input and output parameters may be transmitted directly to the controller from either the data store 1104 or terminator 1102. For example, FIG. 12 depicts a hierarchy graph 1200, where parameter P4 is not generated by a proceeding first WBSN used to call a second WBSN, in one embodiment. As shown by FIG. 12, the graph 1200 is similar to graph 1100, however parameter P4, which was not generated by a proceeding WBSN, is directly transmitted to control 1001 and used to determine when to initiate WBSN 2.0.

Figure 13:
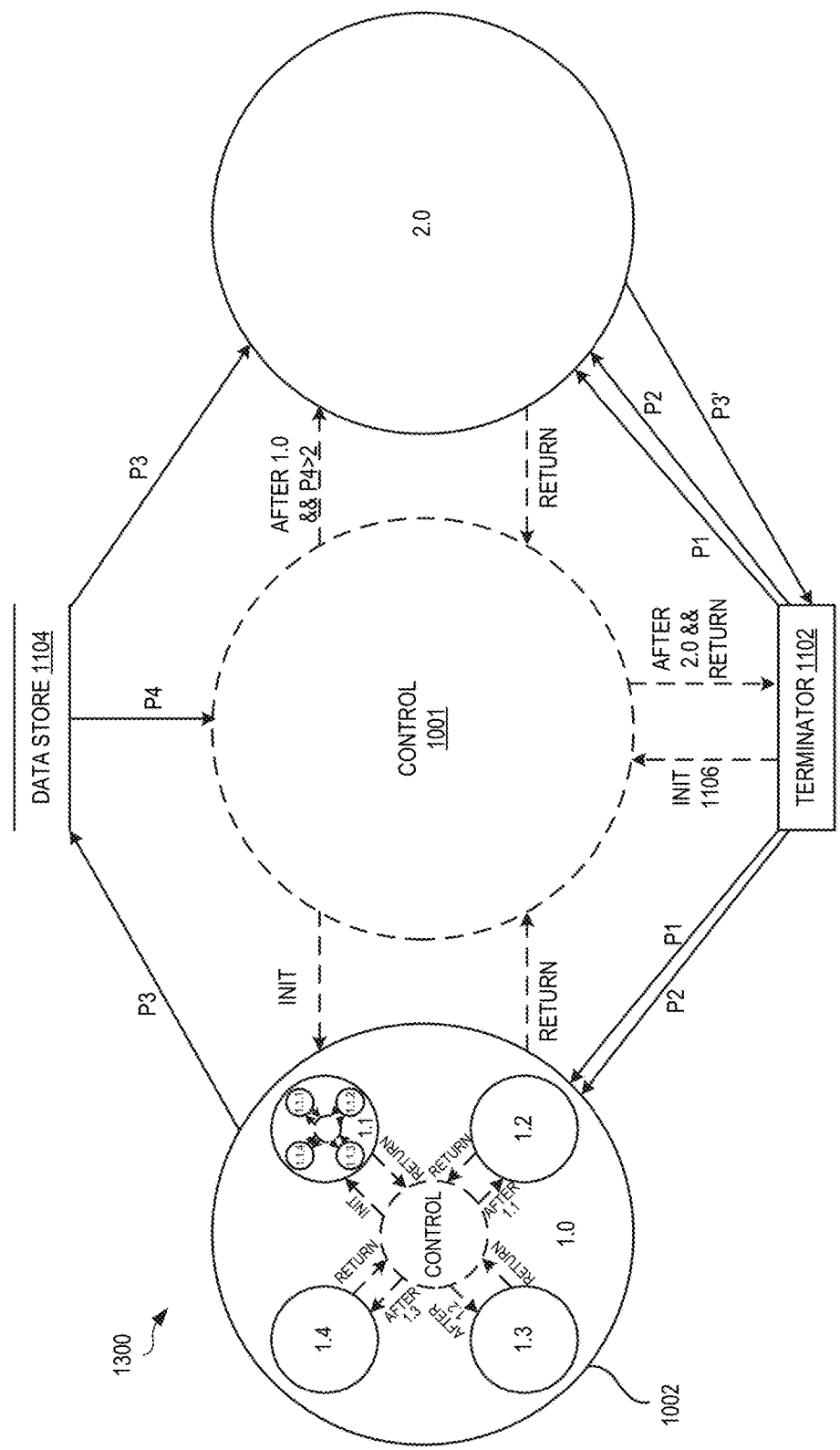
FIG. 13 depicts another exemplary hierarchy graph where parameter P4 is generated by a proceeding first WBSN used to call a second WBSN, in one embodiment.

FIG. 13 depicts a hierarchy graph 1300 where parameter P4 is generated by a proceeding first WBSN used to call a second WBSN, in one embodiment. Graph 1300 is similar to graph 1100, however parameter P4, which was generated by a proceeding WBSN (and therefore stored within data store 1104) is directly transmitted to control 1001 and used to determine when to initiate WBSN 2.0.

Referring back to method 800 of FIG. 8, step 812 is a decision. In step 812, method 800 determines if all hierarchical levels of the decomposition graph have been updated in step 810 to include input and output parameters. If all levels are not complete, method 800 repeats steps 808-810 until all levels are complete. If all levels are complete, method 800 continues with step 816.

Figure 14:
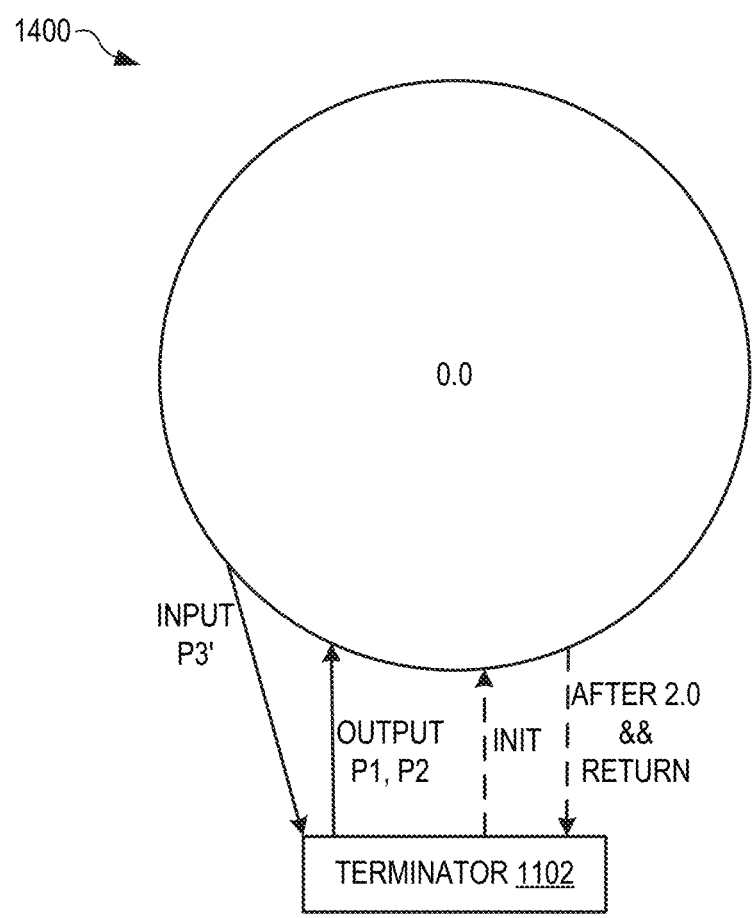
FIG. 14 depicts an exemplary context level diagram created by software design extraction module of FIG. 1 based upon the hierarchy graph of FIG. 12.

Step 816 is optional, as indicated by the dashed outline. In step 816, method 800 generates a context level for the hierarchical diagram. FIG. 14 depicts an exemplary context level diagram 1400 created by software design extraction module 110 based upon the hierarchy graph 1200 of FIG. 12. Different context level diagrams may be created based upon one or more of the passive requirements and active requirements of the software design for a given application.

All lower decomposition levels are formed analogously to the formation of the decomposition level. The context level 0.0 within FIG. 14 is created after the first decomposition level has been created because the necessary information may only be obtained from the first decomposition level which is the first described requirement level. All terminators shown on the first decomposition level are also shown on the context level. For example, terminator 1102 of FIG. 12 is also shown on context level diagram 1400. All inputs and outputs associated with the terminators and all controls into and out of the terminators are also shown on the context level. For example, within FIG. 14, outputs P1 and P2 from terminator 1102, used within decomposition level 1.0 in FIG. 12, and inputs P3' input into terminator 1102 from level 2.0, are also shown on context level diagram 1400. Additionally, the "init" control flow and the "after 2.0 && return" control flow from terminator 1102 is shown with context level diagram 1400.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for automatic extraction of software design from a requirements document, the method comprising:
   (A) extracting, from the requirements document using a processor, a plurality of passive requirements within the requirements document, and a requirement calling condition for each of the passive requirements to generate a requirements hierarchical decomposition table defining a plurality of decomposition levels and a work-breakdown structure based upon the plurality of passive requirements and corresponding requirement calling conditions;
   (B) automatically generating, using the processor, an initial hierarchical decomposition design having the plurality of decomposition levels defined by the work-breakdown structure, the initial hierarchical decomposition design including a respective kernel for each of the passive requirements, and control flow between at least some of the respective kernels for some of the passive requirements based on the requirement calling condition;
   (C) automatically extracting, from the requirements document using the processor, active requirements identifying input and/or output parameters for each decomposition level in the initial hierarchical decomposition design; and
   (D) generating a current hierarchical decomposition design by inserting, automatically via the processor, the input and/or output parameters into the initial hierarchical decomposition graph for each of the plurality of decomposition levels.

2. The method of claim 1, wherein the requirements document includes at least one of project information, and code sorting constraints.

3. The method of claim 1, the step of generating a current hierarchical decomposition design comprising identifying terminators and data stores within the decomposition design.

4. The method of claim 1, further comprising: repeating steps (C)-(D) for each decomposition level until all input and/or output parameters are associated with at least one decomposition level.

5. The method of claim 1, further comprising generating, within the current hierarchical design, a context level defining the input and/or output parameters for a highest decomposition level of each of the decomposition levels.

6. A software product comprising instructions, stored on non-transitory computer-readable media, wherein the instructions, when executed by a computer, perform steps for automatic extraction of software design from a requirements document, comprising:
   (A) instructions for extracting a plurality of passive requirements and a requirement calling condition for each of the passive requirements from the requirements document to generate a requirements hierarchical decomposition table defining a plurality of decomposition levels and a work-breakdown structure corresponding to the plurality of passive requirements and the requirement calling conditions;
   (B) instructions for generating an initial hierarchical decomposition design having the plurality of decomposition levels defined by the work-breakdown structure, the initial hierarchical decomposition design including a respective kernel for each of the passive requirements, and control flow between at least some of the respective kernels for some of the passive requirements based on the requirement calling condition;
   (C) instructions for automatically extracting active requirements from the requirements document identifying input and/or output parameters based on the active requirements for each decomposition level in the initial hierarchical decomposition design; and
   (D) instructions for generating a current hierarchical decomposition design by inserting, automatically via the processor, the input and/or output parameters into the initial hierarchical decomposition graph for each of the plurality of decomposition levels.

7. The software product of claim 6, wherein the requirements document includes at least one of project information, and code sorting constraints.

8. The software product of claim 6, the instructions for generating a current hierarchical decomposition design comprising instructions for identifying terminators and data stores within the decomposition design.

9. The software product of claim 6, further comprising instructions for repeating steps (C)-(D) for each decomposition level until all input and/or output parameters are associated with at least one decomposition level.

10. The software product of claim 6, further comprising instructions for generating, within the current hierarchical design, a context level defining the input and/or output parameters for a highest decomposition level of each of the decomposition levels.

11. A development server for automatic extraction of software design from a requirements document, comprising:
   a processor; and
   a non-transitory memory communicatively coupled with the processor for storing (i) the requirements document and (ii) a software design extraction module implemented as machine readable instructions that when executed by the processor are capable of:
      (A) extracting a plurality of passive requirements and a requirement calling condition for each of the passive requirements from the requirements document to generate a requirements hierarchical decomposition table defining a plurality of decomposition levels and a work-breakdown structure corresponding to the plurality of passive requirements and the requirement calling conditions;

(B) generating an initial hierarchical decomposition design having the plurality of decomposition levels defined by the work-breakdown structure, the initial hierarchical decomposition design including a respective kernel for each of the passive requirements, and control flow between at least some of the respective kernels for some of the passive requirements based on the requirement calling condition;

(C) automatically extracting, from the requirements document, active requirements identifying input and/or output parameters for each decomposition level in the initial hierarchical decomposition design; and (D) generating a current hierarchical decomposition design by inserting, automatically via the processor, the input and/or output parameters into the initial hierarchical decomposition graph for each of the plurality of decomposition levels.

12. The development server of claim 11, wherein the software design extraction module further comprising machine readable instructions that when executed by the processor are capable of repeating steps (C)-(D) for each decomposition level until all input and/or output parameters are associated with at least one decomposition level.

* * * * *